US012718634B2

(12) United States Patent
Makita et al.

(10) Patent No.: US 12,718,634 B2
(45) Date of Patent: Aug. 25, 2026

(54) ELECTRONIC CONTROL DEVICE, VEHICLE INFORMATION PROVISION METHOD, AND NON-TRANSITORY COMPUTER READABLE STORAGE MEDIUM

(71) Applicants: DENSO CORPORATION, Kariya-city (JP); TOYOTA JIDOSHA KABUSHIKI KAISHA, Toyota (JP)

(72) Inventors: Takanari Makita, Kariya-city (JP); Daishi Miyata, Kariya-city (JP); Takuya Hasegawa, Kariya-city (JP); Ryo Mizuno, Toyota (JP); Ryota Arai, Nagoya (JP); Takashi Hosoi, Nagoya (JP)

(73) Assignees: DENSO CORPORATION, Kariay-city (JP); TOYOTA JIDOSHA KABUSHIKI KAISHA, Toyota (JP)

( * ) Notice: Subject to any disclaimer, the term of this patent is extended or adjusted under 35 U.S.C. 154(b) by 176 days.

(21) Appl. No.: 18/317,122

(22) Filed: May 15, 2023

(65) Prior Publication Data

US 2023/0377383 A1 Nov. 23, 2023

(30) Foreign Application Priority Data

May 19, 2022 (JP) ................................ 2022-082283

(51) Int. Cl.

| | |
|---|---|
| ***G07C 5/02*** | (2006.01) |
| ***G06F 8/70*** | (2018.01) |
| ***H04L 12/40*** | (2006.01) |

(52) U.S. Cl.

CPC ................. *G07C 5/02* (2013.01); *G06F 8/70* (2013.01); *H04L 12/40* (2013.01); *H04L 2012/40215* (2013.01)

(58) Field of Classification Search

CPC .. G07C 5/02; G06F 8/70; H04L 12/40; H04L 2012/40215

(Continued)

(56) References Cited

U.S. PATENT DOCUMENTS 8,135,385 B2 * 3/2012 Ohta .................. H04W 12/082 455/410
11,546,427 B2 * 1/2023 Grzegorczyk .......... H04L 67/12

(Continued)

FOREIGN PATENT DOCUMENTS

CN 112291124 A 1/2021
EP 3188068 A1 7/2017

(Continued)

OTHER PUBLICATIONS

"Adaptive Platform—Autosar," Autosar Adaptive Release 20-11 (https://www.autosar.org/standards/adaptive-platform/), dated Oct. 21, 2021.

*Primary Examiner* — Hunter B Lonsberry
*Assistant Examiner* — Helen Li
(74) *Attorney, Agent, or Firm* — Harness, Dickey & Pierce, P.L.C.

(57) ABSTRACT

An electronic control device includes: a data extraction unit that extracts data from a data frame conforming to a predetermined communication protocol; a vehicle information generation unit that generates vehicle information based on the data extracted by the data extraction unit; a vehicle information storage unit that stores the vehicle information generated by the vehicle information generation unit; and a vehicle information provision unit that provides the vehicle information stored by the vehicle information storage unit to one of the applications as a request source that requests the vehicle information to be provided.

8 Claims, 16 Drawing Sheets

(58) Field of Classification Search
USPC ........................................................ 701/32.7
See application file for complete search history.

(56) References Cited

U.S. PATENT DOCUMENTS

| | | | | |
|---|---|---|---|---|
| 2006/0217885 | A1* | 9/2006 | Crady | G05D 1/0287 701/469 |
| 2014/0073254 | A1* | 3/2014 | Ichihara | H04W 76/14 455/41.2 |
| 2015/0326529 | A1* | 11/2015 | Morita | G06F 21/6218 726/12 |
| 2017/0270305 | A1* | 9/2017 | Kodama | H04L 67/12 |
| 2018/0059917 | A1* | 3/2018 | Takehara | G06F 3/1238 |
| 2018/0063246 | A1* | 3/2018 | Vangelov | H04L 12/40013 |
| 2019/0077368 | A1* | 3/2019 | Hwang | B60R 25/24 |
| 2019/0126858 | A1 | 5/2019 | Parmar et al. | |
| 2019/0306136 | A1* | 10/2019 | David | H04L 9/3242 |
| 2021/0112147 | A1* | 4/2021 | Ohashi | H04L 67/12 |
| 2021/0274544 | A1* | 9/2021 | Yang | H04W 72/1268 |

FOREIGN PATENT DOCUMENTS

| | | | |
|---|---|---|---|
| JP | 2011-218974 | A | 11/2011 |
| JP | 2014-083074 | A | 5/2014 |
| JP | 2015139093 | A | 7/2015 |
| JP | 6706965 | B2 * | 6/2020 |
| JP | 2021-064827 | A | 4/2021 |

* cited by examiner

ECU
APP LAYER
APP
APP
APP
9
9a
MID WARE LAYER
SCENE COORD
CAR DAT COORD
CAN SERVICE
10
11
12
13
2ND CONT U
6
1ST CONT U
5
STORAGE
7
ETHERNET
8
CAN BUS
1
2
ECU
3
ECU
4

12
CAR DAT COORD
11
CAN SERVICE
5
1ST CONT U
CAN BUS
CANPDU (AUTOSAR PDU)
CANID
DLC
CAN DATA (0-64byte)
ETHERNET FRAME
ple-
amble
MAC
IP
UDP
CANID
DLC
CAN DATA
FCS
CAN/CAN FD FRAME
RECESSIVE
BUS IDLE
DOMINANT
SOF
ID
RTR
CONT
FIELD
DAT FIELD
EOF
ITM
BUS
IDLE
CRC SEQUENCE
CRC DELIMITER
ACK SLOT
ACK DELIMITER 2
CAN BUS
5
1ST CONT U
8
ETHERNET
6
2ND CONT U
12
CAR DAT COORD
12a
DAT EXTRACT U
12b
VEH INF GENE U
12c
VEH INF STORAGE U
12d
REGIST REQ RECEPT U
12e
UPDATE EXIST DET U
12f
PROV REQ RECEPT U
12g
VEH INF PROV U

FIG. 6

12a
DAT EXTRACT U

CAN DAT
「01 23 45 67 ab ····」

12b
VEH INF
GENE U

VEH INF
VEH SPEED「60km/h」

12c
VEH INF
STORAGE U

FIG. 7

VEH INF LIST

| VEH INF TYPE | VEH INF |
| --- | --- |
| EXIST OF SMART KEY | True／False |
| HAZARD STA | ON/OFF |
| DRI SIDE DOOR | OPEN / LOCK / UNLOCK |
| FUEL CONSUM AMO | 5ml |
| IG RELAY STA | ON/OFF |
| VAL IN ODO | 123456km |
| VEH SPEED | 40km／h |
| VEH LOCATION | LONGITUDE / LATITUDE |
| DATE | 2021／09／30 10:00:00 |

FIG. 8

VEH INF LIST (EXIST OF SMART KEY)

| T STAMP (DATE) | VEH INF |
|---|---|
| 20210930 09:00:00 | True |
| 20210930 09:05:00 | False |
| 20210930 09:35:00 | True |
| 20210930 09:55:00 | False |
| | |
| | |
| | |
| | |
| | |

FIG. 9

VEH INF LIST (HAZARD STA)

| T STAMP (DATE) | VEH INF |
|---|---|
| 20210930 09:00:00 | OFF |
| 20210930 09:47:00 | ON |
| 20210930 09:48:00 | OFF |
| | |
| | |
| | |
| | |
| | |
| | |

FIG. 10

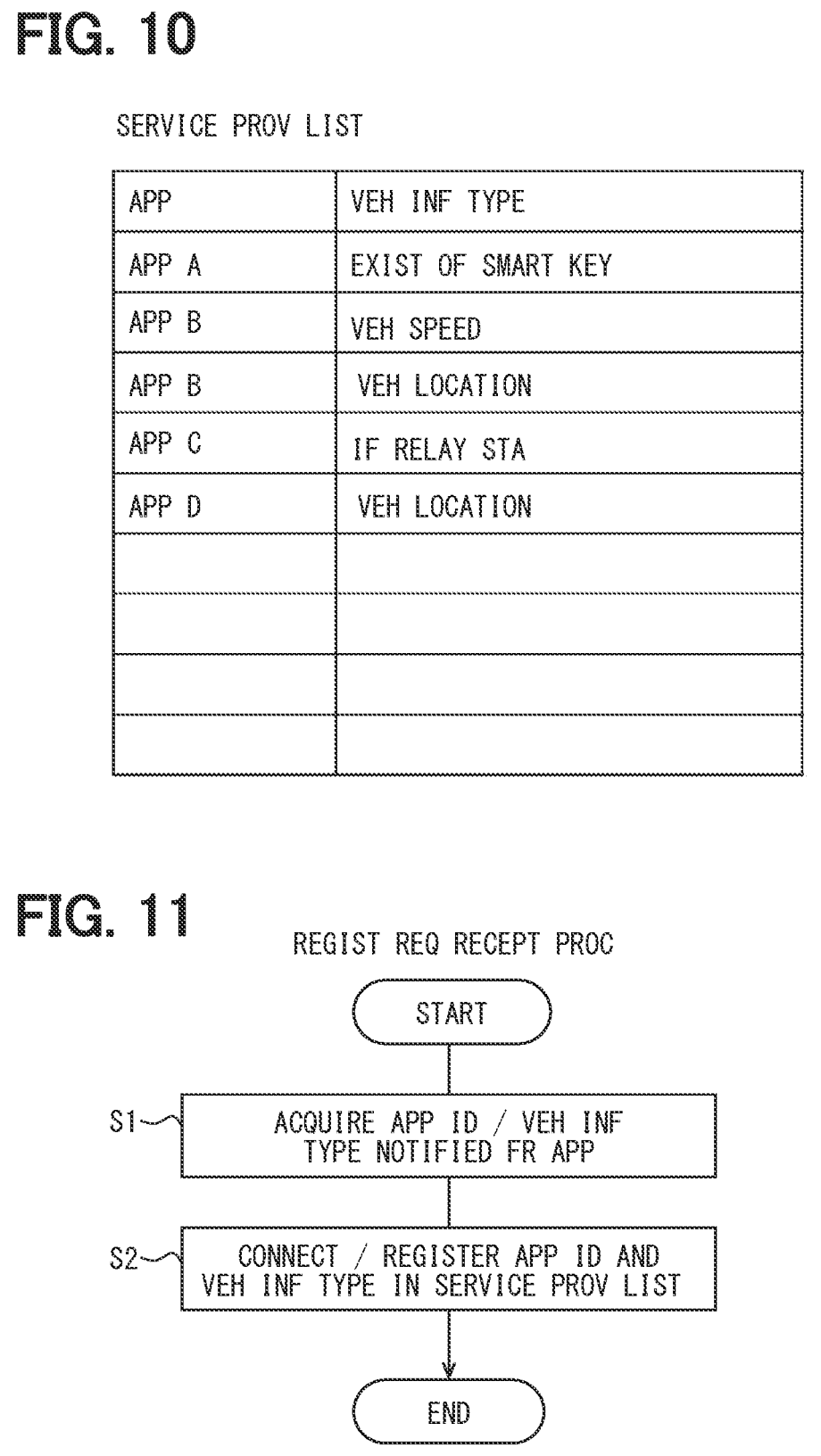

SERVICE PROV LIST

| APP | VEH INF TYPE |
| --- | --- |
| APP A | EXIST OF SMART KEY |
| APP B | VEH SPEED |
| APP B | VEH LOCATION |
| APP C | IF RELAY STA |
| APP D | VEH LOCATION |
| | |
| | |
| | |
| | |

FIG. 11

PROV REQ RECEPT PROC

START

S31 ACQUIRE APP ID AND DEST VEH INF NOTIFIED FR APP

S32 SPECIFY APP AS PROV DEST OF VEH INF

S33 SPECIFY VEH INF TYPE TO EB PROV TO APP AS PROV DEST

S34 REFER TO VEH INF LIST

S35 PROVIDE VEH INF TO APP AS PROV DEST

END

FIG. 16

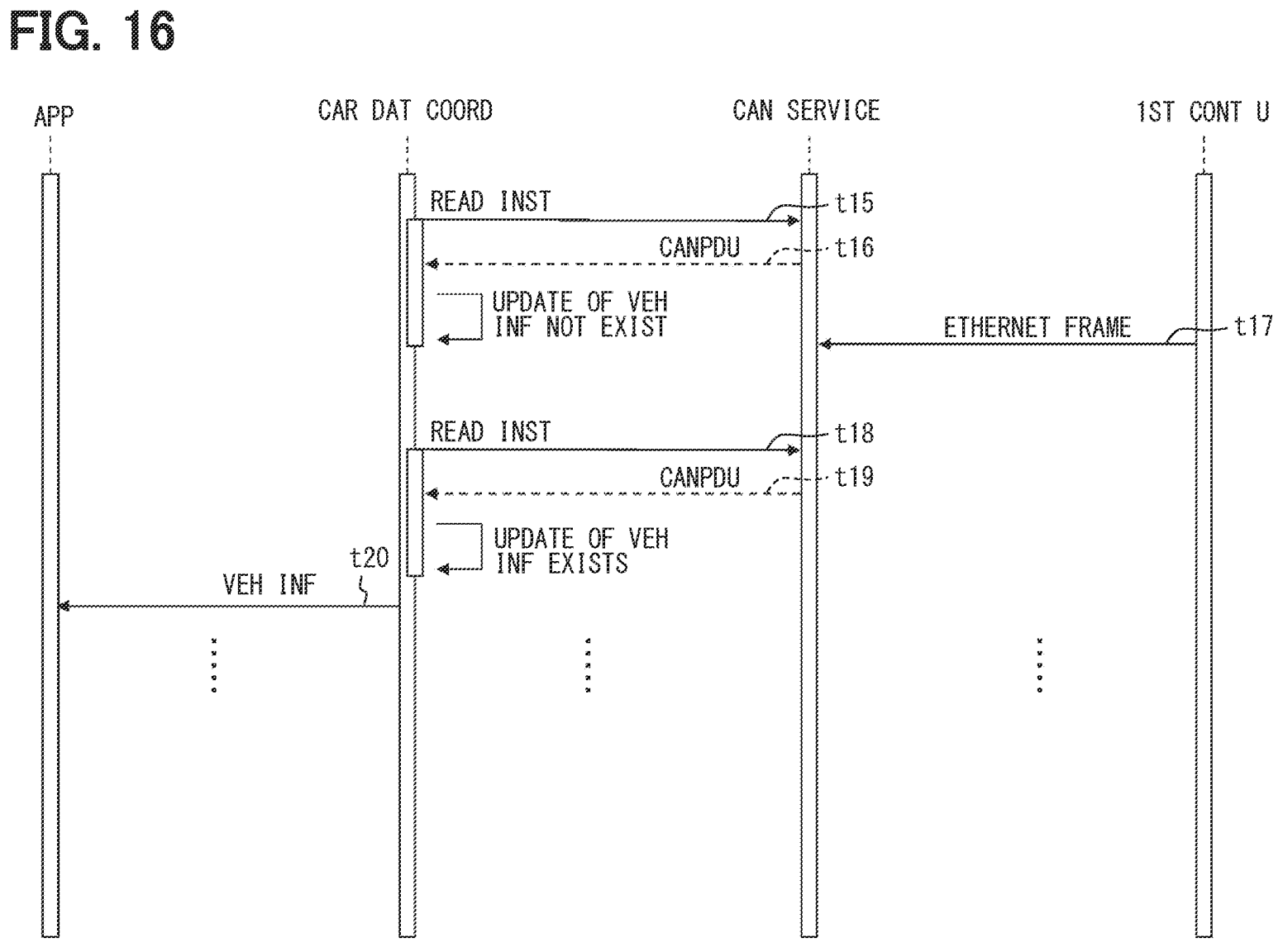

APP

CAR DAT COORD

CAN SERVICE

1ST CONT U t17

ETHERNET FRAME t15 t16

READ INST

CANPDU

UPDATE OF VEH INF NOT EXIST t18 t19

READ INST

CANPDU

UPDATE OF VEH INF EXISTS t20

VEH INF

APP
CAR DAT COORD
CAN SERVICE
1ST CONT U
REGIST REQ
(APP ID, VEH SPEED)
t6
t9
「58km/h」
t13
「60km/h」
OPEN INST
t1
RESPONSE
t2
SET ID FILT INST
t3
RESPONSE
t4
READ INST
t7
CANPDU
t8
1ST T
「58km/h」
READ INST
t11
CANPDU
t12
「58km/h」→
「60km/h」
ETHERNET FRAME
t5
ETHERNET FRAME
t10
ETHERNET FRAME
t14

FIG. 18

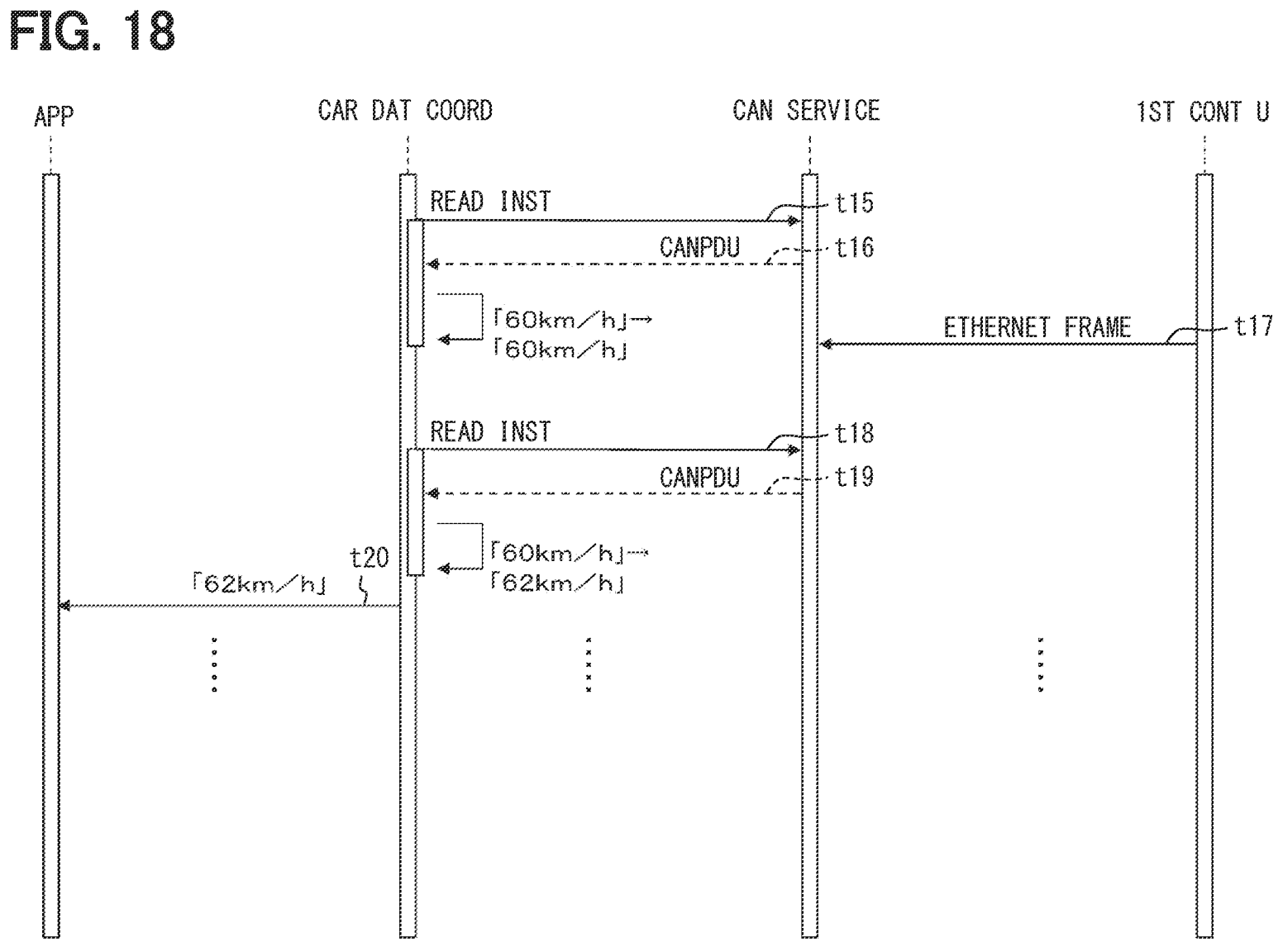

APP
CAR DAT COORD
CAN SERVICE
1ST CONT U
READ INST
t15
CANPDU
t16
「60km/h」→
「60km/h」
ETHERNET FRAME
t17
READ INST
t18
CANPDU
t19
「60km/h」→
「62km/h」
t20
「62km/h」

ELECTRONIC CONTROL DEVICE, VEHICLE INFORMATION PROVISION METHOD, AND NON-TRANSITORY COMPUTER READABLE STORAGE MEDIUM

CROSS REFERENCE TO RELATED APPLICATIONS

The present application claims the benefit of priority from Japanese Patent Application No. 2022-082283 filed on May 19, 2022. The entire disclosure of the above application is incorporated herein by reference.

TECHNICAL FIELD

The present disclosure relates to an electronic control device, a vehicle information provision method, and a non-transitory computer readable storage medium.

BACKGROUND

In a vehicle control system, for example, an electronic control device (hereinafter referred to as an ECU, i.e., Electronic Control Unit) is connected to a CAN (Controller Area Network, registered trademark) bus.

SUMMARY

According to an example, an electronic control device may include: a data extraction unit that extracts data from a data frame conforming to a predetermined communication protocol; a vehicle information generation unit that generates vehicle information based on the data extracted by the data extraction unit; a vehicle information storage unit that stores the vehicle information generated by the vehicle information generation unit; and a vehicle information provision unit that provides the vehicle information stored by the vehicle information storage unit to one of the applications as a request source that requests the vehicle information to be provided.

BRIEF DESCRIPTION OF THE DRAWINGS

The above and other objects, features and advantages of the present disclosure will become more apparent from the following detailed description made with reference to the accompanying drawings. In the drawings:

FIG. 6 is a diagram showing CAN data and vehicle information;

FIG. 7 is a diagram showing a vehicle information list;

FIG. 8 is a diagram showing a vehicle information list;

FIG. 9 is a diagram showing a vehicle information list;

FIG. 10 is a diagram showing a service provision list;

FIG. 11 is a flowchart showing registration request reception processing;

FIG. 13 is a flowchart showing update processing;

FIG. 16 is a sequence diagram;

FIG. 18 is a sequence diagram.

DETAILED DESCRIPTION

Figure 1:
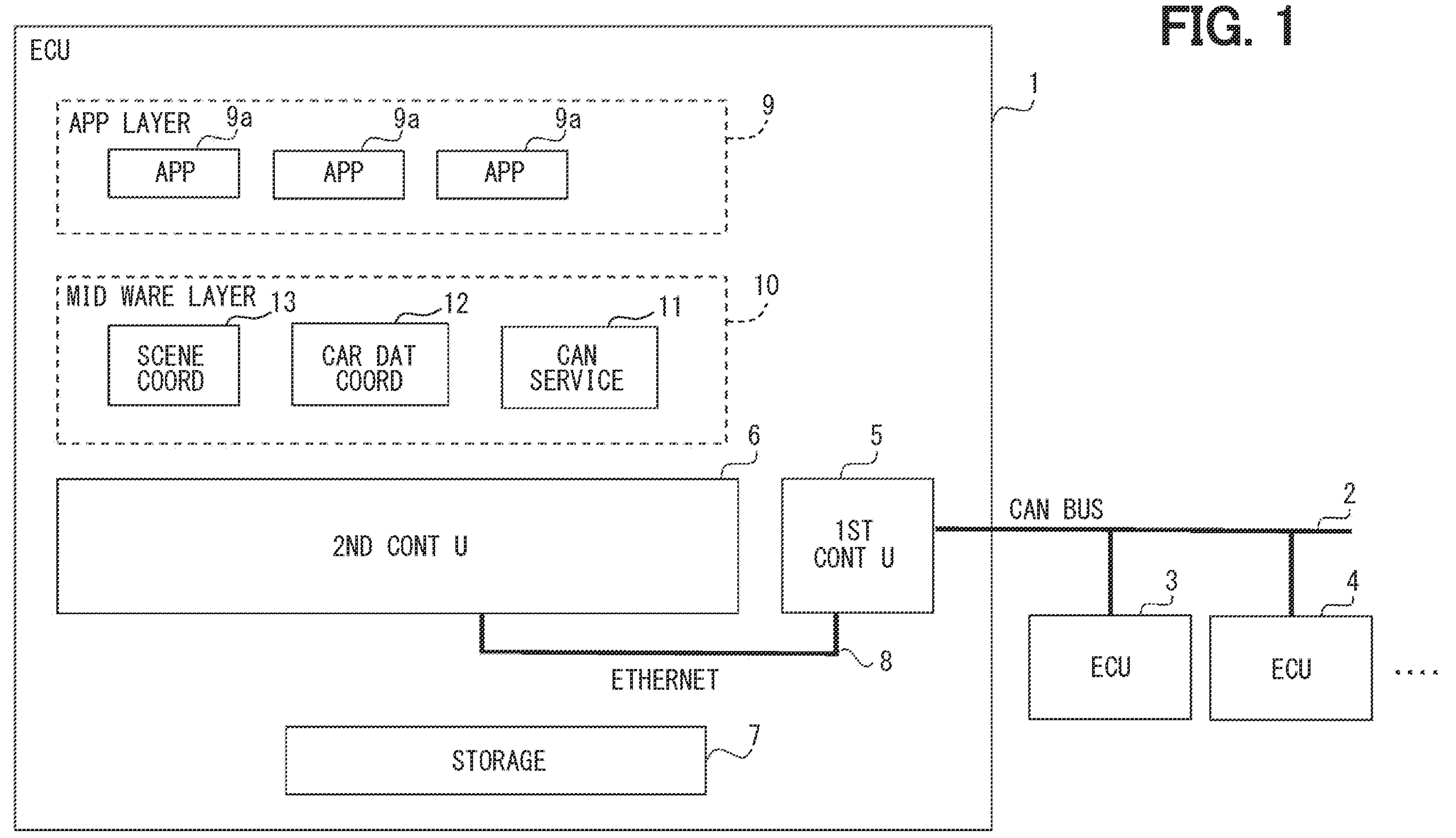
FIG. 1 is a functional block diagram showing an embodiment.

When the ECU is connected to the CAN bus and the control unit mounted on the ECU executes a plurality of applications, each of the plurality of applications extracts CAN data from the CAN frame, and generates vehicle information based on the extracted CAN data. However, in a configuration in which each of multiple applications generates vehicle information separately, it is necessary to prepare a program module for generating vehicle information for each application, so that there may be a difficulty such that costs increase and a lot of time and effort when developing applications are necessary. In addition, the memory capacity of the storage for storing program modules for each application is consumed largely. Furthermore, if logic for generating vehicle information based on the CAN data differs between applications, there is a possibility that different vehicle information may be generated from the same CAN data, and there is also a possibility that trouble may occur in the operation between applications when utilizing the different vehicle information.

The present embodiments have been made in view of the circumstances described above, and an object of the present embodiments is to provide an electronic control device, a vehicle information provision method, and a vehicle information provision program, which enable each of a plurality of applications to easily and appropriately utilize vehicle information based on data conforming to a predetermined communication protocol.

According to the first aspect of the embodiments, a control unit for executing a plurality of applications is provided. A data extraction unit extracts data from a data frame conforming to a predetermined communication protocol. A vehicle information generation unit generates vehicle information based on the data extracted by the data extraction unit. A vehicle information storage unit stores the vehicle information generated by the vehicle information generation unit. A vehicle information provision unit provides the vehicle information stored by the vehicle information storage unit to one of the applications as a request source that requests the vehicle information to be provided.

The data is extracted from the data frame conforming to the predetermined communication protocol, the vehicle information is generated and stored based on the extracted data, and the stored vehicle information is provided to the request source application that requests the vehicle information to be provided.

Thus, it is not necessary to prepare a program module for generating vehicle information for each application, and it is possible to suppress the increase in cost and the occurrence of a lot of time and effort when developing applications, and it is also possible to suppress the consumption of storage memory capacity. Furthermore, there is no possibility of generating different vehicle information from the same data conforming to a predetermined communication protocol, and there is no possibility of trouble occurring in operations between applications. Thereby, each of the plurality of applications can easily and appropriately use the vehicle information based on the data conforming to the predetermined communication protocol.

Hereinafter, one embodiment will be described with reference to the drawings. As shown in FIG. 1, a master ECU 1 mounted on a vehicle acquires information from, for example, a power train ECU, a body ECU, a cockpit ECU, a chassis ECU, a safety ECU, and the like, or instructs each ECU to control the vehicle. In order to realize this feature, the master ECU 1 includes multiple applications and multiple middleware. The master ECU 1 functions as an update master that manages the execution of reprogramming for the purpose of, for example, improving functions and recovering defects.

The master ECU 1 is connected to a plurality of ECUs 3 and 4 via a CAN bus 2 (Controller Area Network bus, registered trademark, and corresponding to a communication bus) so as to be capable of data communication, so that the master ECU 1 integrally manage the plurality of ECUs 3, 4 by instructing an operation to the plurality of ECUs 3, 4 and acquiring operating states from the plurality of ECUs 3, 4. The number of ECUs connected to the master ECU 1 via the CAN bus 2 may not be limited to two, but may be arbitrary. The plurality of ECUs 3 and 4 are, for example, a power train ECU, a body ECU, a cockpit ECU, a chassis ECU, a safety ECU, and the like.

The master ECU 1 is connected to a DCM (Data Communication Module) functioning as a data communication device. The DCM makes it possible to transmit and receive data by wirelessly connecting to the outside via a communication network. The DCM is wirelessly connected to an OTA center via a communication network so that a distribution package transmitted from the OTA center can be received. When receiving the distribution package transmitted from the OTA center, the DCM transmits the received distribution package to the master ECU 1. When one of a plurality of ECUs is specified as a reprogramming target ECU that functions as a reprogramming target, and the distribution package is transmitted from the DCM, the master ECU 1 extracts an update program from the transmitted distribution package, and instructs the reprogramming target ECU to write the extracted update program to execute the reprogram process.

The master ECU 1 includes a first control unit 5, a second control unit 6 (corresponding to a control unit), and a storage 7. The first control unit 5 and the second control unit 6 each include a microcomputer having a CPU (Central Processing Unit). The master ECU 1 has a ROM (i.e., Read Only Memory), a RAM (i.e., Random Access Memory) and an I/O (i.e., Input/Output). The first control unit 5 and the second control unit 6 each execute a control program stored in a non-transitory tangible storage medium to execute processing corresponding to the control program, and control a whole of operations of the master ECU 1 in cooperation with each other. The control program executed by the second control unit 6 includes a vehicle information provision program.

The first control unit 5 is connected to the ECUs 3 and 4 via the CAN bus 2, and performs data communication with the ECUs 3 and 4 according to the CAN protocol (corresponding to the predetermined communication protocol). The first control unit 5 and the second control unit 6 are connected via the Ethernet 8, and perform data communication between them according to the Ethernet protocol. That is, the first controller 5 is directly connected to the CAN bus 2. The second control unit 6 is not directly connected to the CAN bus 2 but is connected to the CAN bus 2 via the Ethernet 8. Data communication by the Ethernet protocol is faster and has a larger capacity than data communication by the CAN protocol. The first control unit 5 and the second control unit 6 correspond to multiple CPUs.

In the hardware architecture of the master ECU 1, the first CPU is connected to the CAN bus 2 and is configured to directly access the CAN bus 2, and the second CPU is not connected to the CAN bus 2 and is configured not to directly access the CAN bus 2. Within the same board, the second CPU is connected to the first CPU via the Ethernet so as to be capable of data communication. Here, instead of a plurality of CPUs, virtual machines that implement the same functions by software may be used.

The storage 7 is a nonvolatile memory mainly including, for example, a NOR flash memory or a NAND flash memory, and is shared by multiple applications executed by the first control unit 5 and the second control unit 6. That is, a plurality of applications each access the storage 7 to write and read data. Although the configuration in which the storage 7 is built in the master ECU 1 is exemplified in this embodiment, it may be also possible to apply a configuration in which the storage 7 is arranged outside the master ECU 1. Further, although the configuration in which the storage 7 is shared by a plurality of applications executed by the first control unit 5 and the second control unit 6 is illustrated, the application executed by the control unit of another ECU connected to the master ECU 1 for data communication may share the storage 7.

Each application 9*a* belonging to the application layer 9 requests to transmit the information to any one of the CAN service 11, the car data coordinator 12, and the scene coordinator 13 belonging to the middleware layer 10 according to the granularity of the requested information when requesting the information about the vehicle. The CAN service 11, the car data coordinator 12, and the scene coordinator 13 each are set with application programming interfaces (APIs) so that information can be provided.

Figure 2:
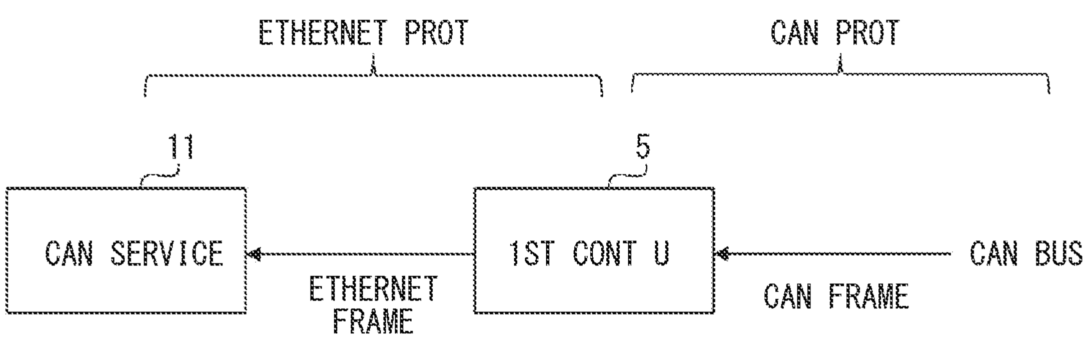
FIG. 2 is a diagram for explaining protocol conversion.

Since the first control unit 5 is directly connected to the CAN bus 2 as described above, it has a function of controlling transmission and reception of CAN frames including CAN data, which conforms to the CAN protocol. Also, the first control unit 5 has a function of protocol-converting a CAN frame into an Ethernet frame. That is, as shown in FIG. 2, when the first control unit 5 receives a CAN frame from the CAN bus 2, the first control unit 5 protocol-converts the received CAN frame into an Ethernet frame, and transmits the protocol-converted Ethernet frame to the CAN service. 11.

Figure 3:
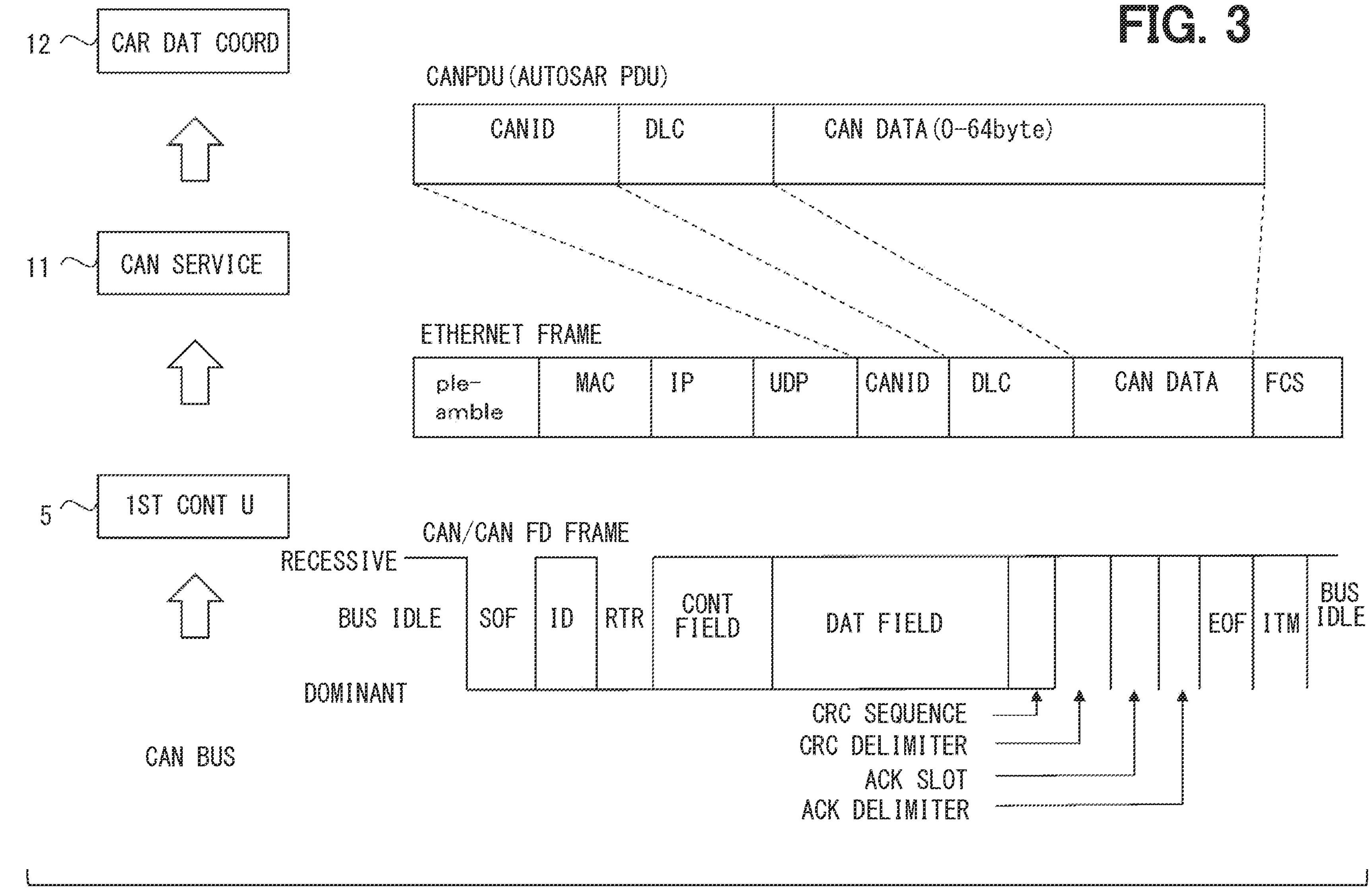
FIG. 3 is a diagram showing a flow when receiving a CAN frame.

As shown in FIG. 3, when the CAN service 11 receives the Ethernet frame transmitted from the first control unit 5, the CAN service 11 extracts the CAN protocol data unit (hereinafter referred to as PDU, i.e., CAN Protocol Data Unit) from the received Ethernet frame, and transmits the extracted CAN PDU to the car data coordinator 12. The PDU is a unit of information that is transmitted and received, and includes a portion of control information defined by a communication protocol and a payload that is the content of data. The ID, the control field, and the data field of the CAN frame correspond to a CANID, a DLC, and a CAN data of the Ethernet frame, respectively.

Figure 4:
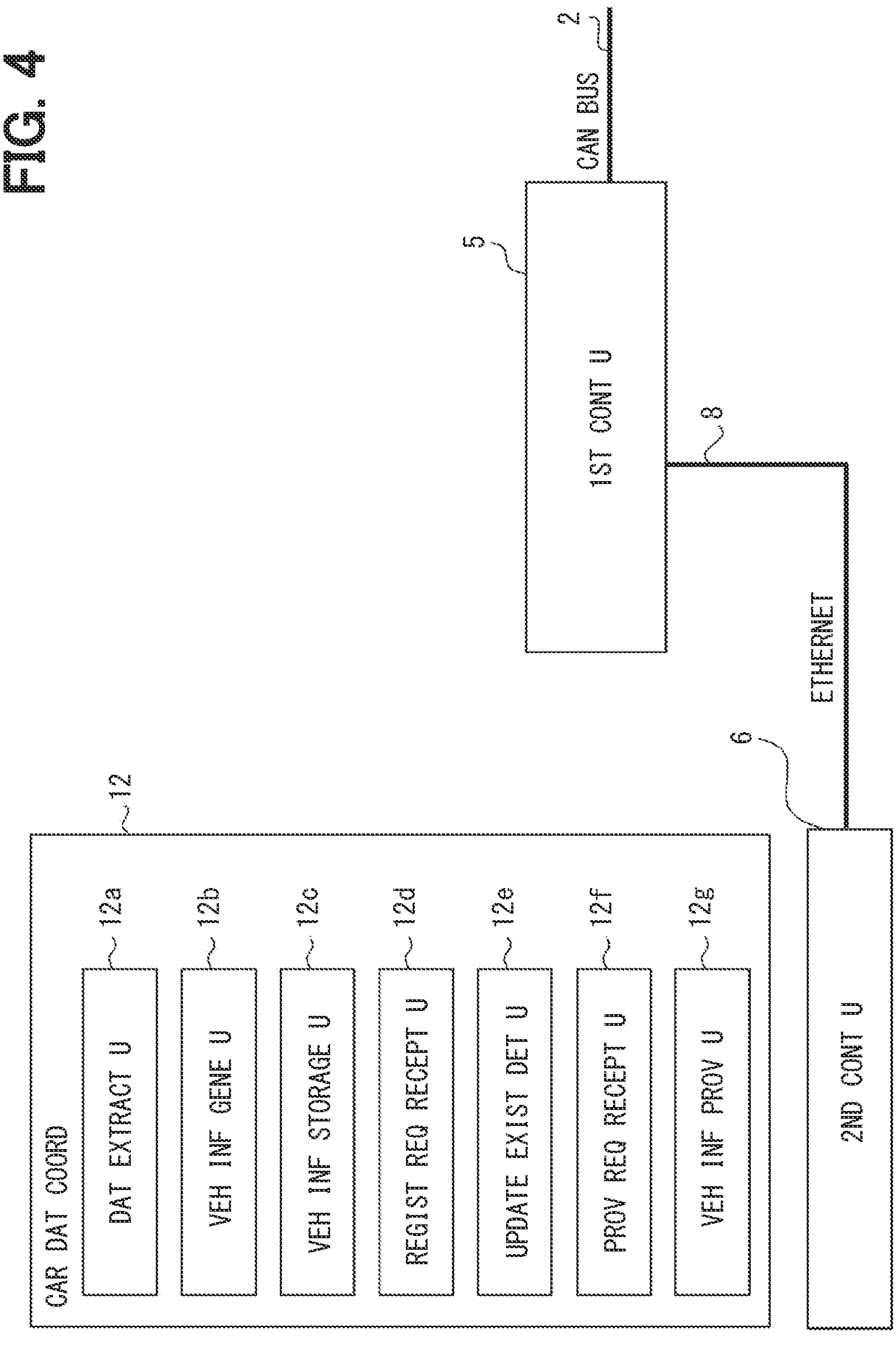
FIG. 4 is a functional block diagram of a car data coordinator.
Figure 5:
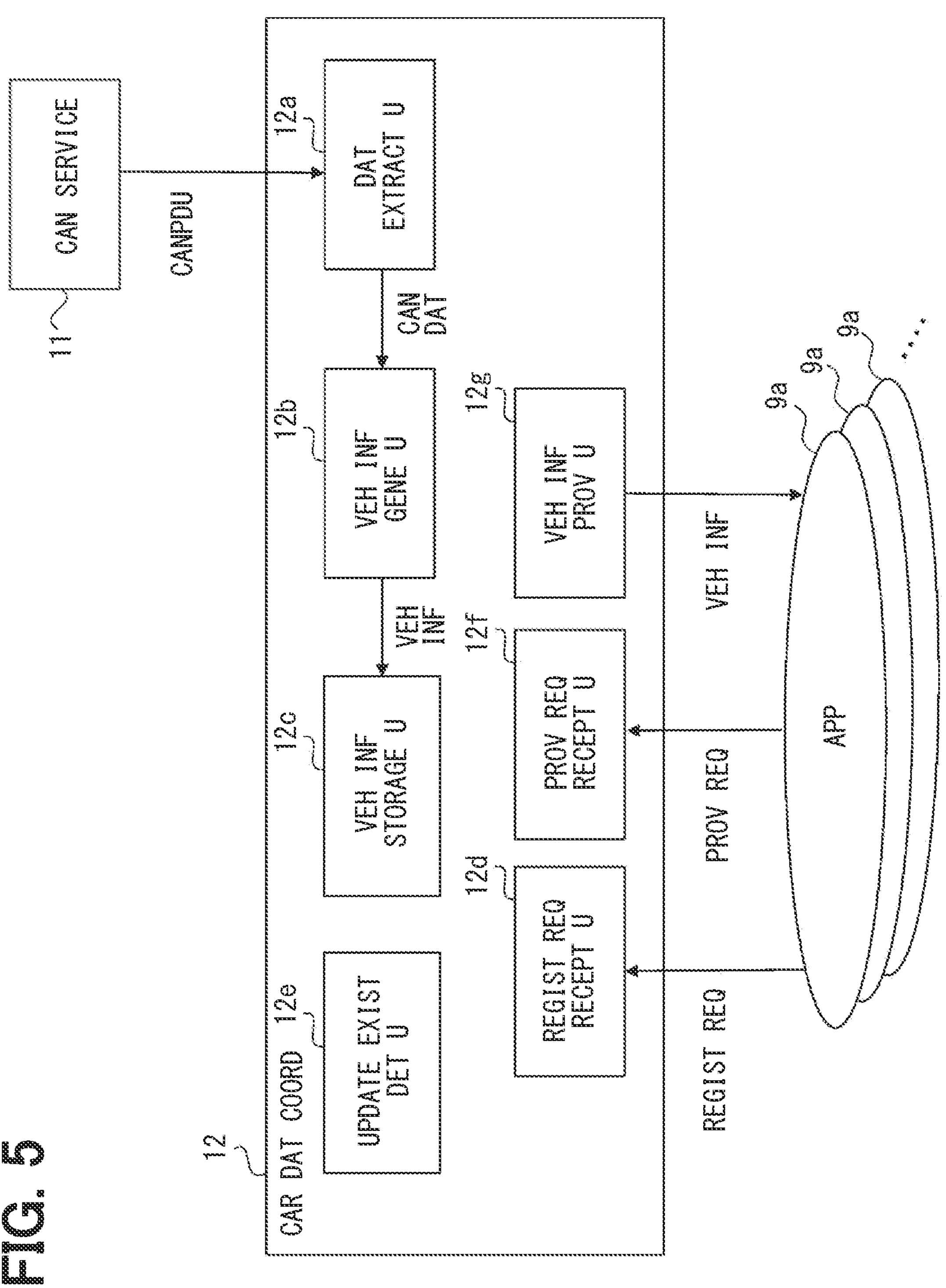
FIG. 5 is a diagram showing a flow when generating vehicle information.

When the car data coordinator 12 receives the CAN PDU transmitted from the CAN service 11, the car data coordinator 12 has a function for generating the vehicle information based on the received CAN PDU, and transmitting the generated vehicle information to the application as the request source for requesting the vehicle information to be provided. The configuration of the car data coordinator 12 will be described below with reference to FIGS. 4 and 5. The car data coordinator 12 includes a data extraction unit 12*a*, a vehicle information generation unit 12*b*, a vehicle information storage unit 12*c*, a registration request reception unit 12*d*, an update existence determination unit 12*e*, a provision request reception unit 12*f*, and a vehicle information provision unit 12*g*. Each unit 12*a* to 12*g* that controls the operation of these car data coordinator 12 is executed by the second control unit 6.

Figure 6:
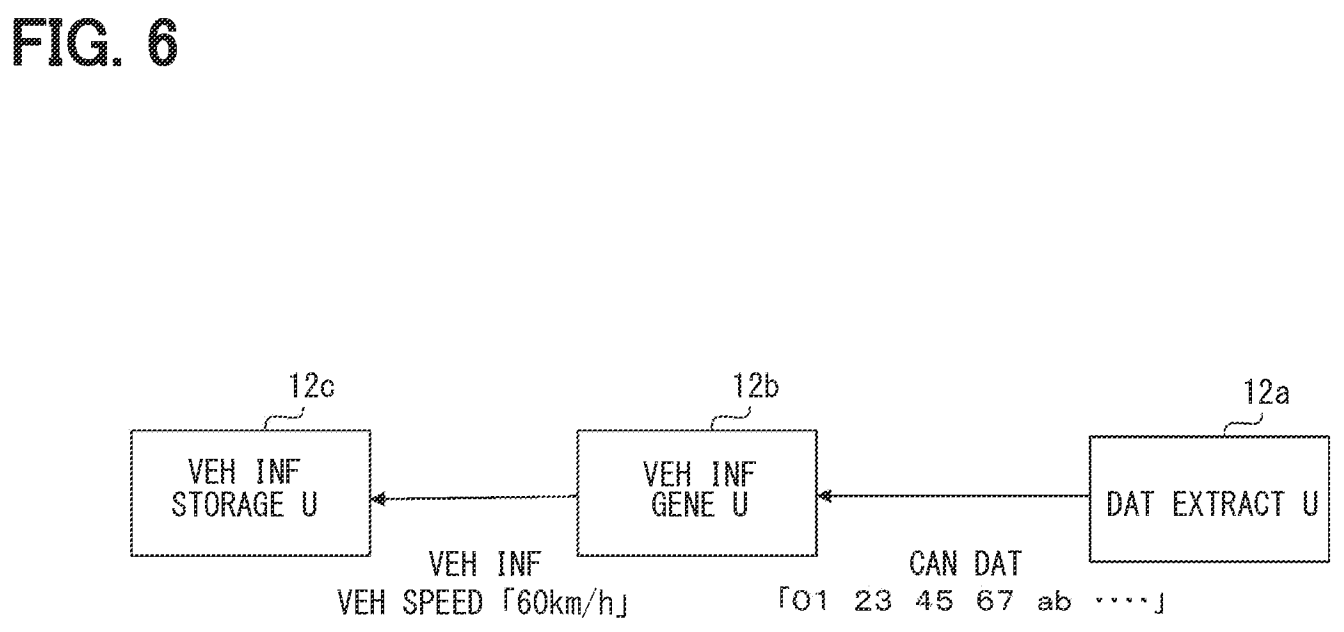

The data extraction unit 12*a*, upon receiving the CAN PDU transmitted from the CAN service 11, extracts the CAN data from the received CAN PDU. The CAN data is in a data format conforming to the CAN communication protocol. When the CAN data is extracted by the data extraction unit 12*a*, the vehicle information generation unit 12*b* interprets the extracted CAN data to generate the vehicle information. As shown in FIG. 6, for example, when the CAN data is "01 23 45 67 ab . . . " in case of the vehicle speed with "60 km/h", the vehicle information generation unit 12*b* generates the data indicative of the vehicle speed with "60 km/h" as the vehicle information. The data generated as the vehicle information is data uniquely specified from the CAN data. For example, the data generated as the vehicle information is data represented by a smaller amount of data than the CAN data.

When the vehicle information is generated by the vehicle information generation unit 12*b*, the vehicle information storage unit 12*c* can store the generated vehicle information in the vehicle information list shown in FIG. 7. In this case, when the vehicle information has not yet been saved, the vehicle information storage unit 12*c* newly stores the vehicle information generated this time. The vehicle information storage unit 12*c* overwrites and stores the vehicle information generated this time when the vehicle information is already stored but the vehicle information generated this time does not match the vehicle information already stored. On the other hand, when the vehicle information has already been stored and the vehicle information generated this time matches the already stored vehicle information, the vehicle information storage unit 12*c* discards the vehicle information generated this time without storing the vehicle information.

The vehicle information to be stored in the vehicle information list includes, in addition to the vehicle speed mentioned above, the existence of a smart key, hazard status, driver's door status, fuel consumption, IG relay status, odometer value, vehicle location, and date. The contents of each vehicle information are as follows.

"Smart key existence" is the information regarding the existence or absence of a smart key, and is "True" when the smart key is disposed in the vehicle, and "False" when the smart key is not disposed in the vehicle.

"Hazard status" is the information about the status of the hazard lamps, which is "on" for flashing status and "off" for extinguished status.

"Driver's door status" is the information about the driver's door. If the driver's door is open, it is "open". If the driver's door is closed and locked, it is "locked". If the driver's door is closed and unlocked, it is "unlocked".

"Fuel Consumption" is the information on fuel consumption, which is a numerical value from "0 ml" to "32 ml", for example.

"IG relay status" is the information about the drive state of the IG relay, such as "on" when the IG relay is in the on state, and "off" when the IG relay is in the off state.

"Odometer value" is the information about the odometer value and distance information displayed on the odometer.

"Vehicle speed" 8*s* the information on vehicle speed, which is an integrated value of vehicle speed pulse signals and is specified by the number of pulse counters.

"Vehicle location" is the information about the vehicle position indicating the latitude and the longitude specified by the navigation device.

"Date" is the information about date, which is specified by year, month, day, hour, minute, and second.

The vehicle information storage unit 12*c* may store the vehicle information with a time stamp. As shown in FIG. 8, the vehicle information storage unit 12*c* may add a time stamp each time the state of "existence of a smart key" of whether or not the smart key is disposed in the vehicle is updated, for example. By adding a time stamp, it is possible to store the history of the existence of the smart key, so that it is possible to retroactively acquire past vehicle information regarding the existence of the smart key. Further, as shown in FIG. 9, the vehicle information storage unit 12*c* may add a time stamp each time the state of "hazard status" that the switching of the hazard lamp between the flashing state and the extinguished state is updated. By adding a time stamp, it is possible to store the history of the hazard state, and it is possible to retroactively acquire the past vehicle information regarding the hazard state. The same may apply to the vehicle information other than "existence of smart key" and "hazardous status".

The registration request reception unit 12*d* receives a registration request from each of the plurality of applications 9*a*, and registers the received registration request in the service provision list. The registration request is a request for the application 9*a* that requires to receive the vehicle information to be provided, to associate and register the application ID indicating the application 9*a* and the vehicle information type that the application 9*a* requests to be received. As shown in FIG. 10, for example, when the registration request reception unit 12*d* receives a registration request for "existence of a smart key" as the vehicle information type from application A, the application ID of the application A and "existence of a smart key" are associated and registered. Upon receiving a registration request for "vehicle speed" and "vehicle location" as vehicle information types from application B, the registration request reception unit 12*d* associates and registers the application ID of the application B with "vehicle speed" and "vehicle location". The registration request reception unit 12*d* may receive a registration request from the other middleware by handling the other middleware in the same manner as the application 9*a*, and register the received registration request in the service provision list.

The update existence determination unit 12*e* determines whether or not the vehicle information stored by the vehicle information storage unit 12*c* is updated. The update existence determination unit 12*e* determines whether the vehicle information stored by the vehicle information storage unit 12*c* has been updated when the vehicle information generated this time is newly stored or overwritten by the vehicle information storage unit 12*c*. That is, the update existence determination unit 12*e* determines whether the vehicle information is updated each time the vehicle information is newly stored or overwritten by the vehicle information storage unit 12*c* in response to the update of the CAN data. In other words, the vehicle information storage unit 12*c* always stores the latest vehicle information.

The provision request reception unit 12*f* receives a request for providing the vehicle information from each of the plurality of applications 9*a*. A vehicle information provision unit 12*g* provides the vehicle information stored by the vehicle information storage unit 12*c* to one of the applications 9*a* as a request source that requests the vehicle information to be provided. In this case, the vehicle information provision unit 12*g* can provide the vehicle information with different granularity to the request source application 9*a* that requests the vehicle information to be provided. That is, the application 9*a* can acquire the vehicle information with arbitrary granularity. The vehicle information provision unit 12*g* provides the vehicle information when the update existence determination unit 12*e* determines that the vehicle information is updated or when the provision request reception unit 12*f* receives the request for providing the vehicle information from the application 9*a*.

The following will describe an operation of the above configuration with reference to FIG. 11 to FIG. 18. The registration request reception process, the vehicle information storage process, the update process, and the provision request reception process performed by the car data coordinator 12 in the master ECU 1 will be sequentially described.

(1) Registration Request Reception Process (See FIG. 11)

The car data coordinator 12 starts the registration request reception process when the conditions for starting the registration request reception process are established by receiving the registration request from the application 9*a*. When starting the registration request reception process, the car data coordinator 12 acquires the application ID and the vehicle information type notified from the application 9*a* (at S1). The car data coordinator 12 associates the acquired application ID with the vehicle information type and registers them in the service provision list (at S2), and terminates the registration request reception process.

Figure 12:
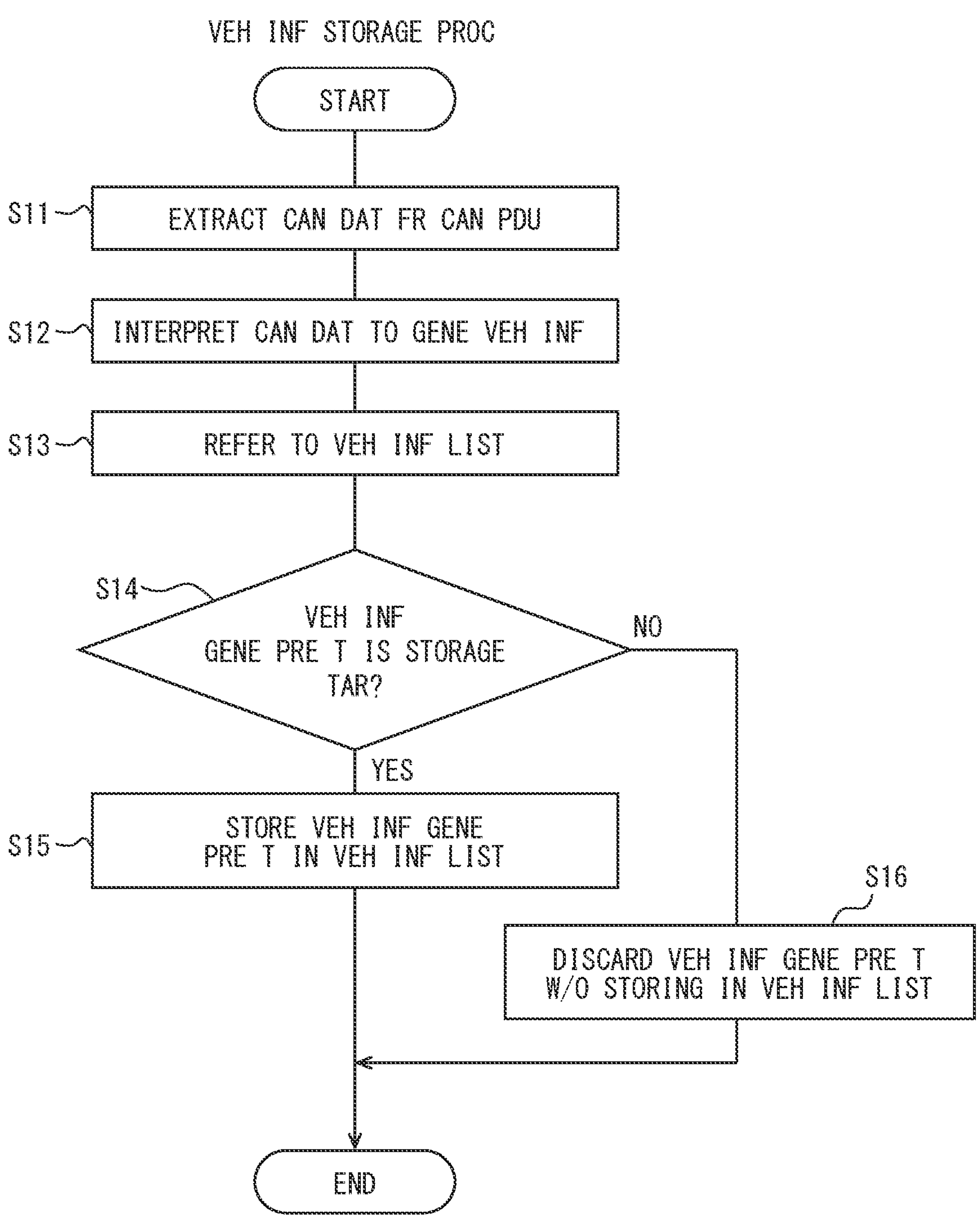
FIG. 12 is a flowchart showing vehicle information storage processing.

(2) Vehicle Information Storage Process (See FIG. 12)

When the car data coordinator 12 receives the CAN PDU from the CAN service 11 and the condition for starting the vehicle information storage process is satisfied, the car data coordinator 12 starts the vehicle information storage process. When starting the vehicle information storage process, the car data coordinator 12 extracts the CAN data from the received CAN PDU (at S11, corresponding to data extraction procedure). The car data coordinator 12 interprets the extracted CAN data and generates the vehicle information (at S12, corresponding to vehicle information generation procedure). The car data coordinator 12 refers to the vehicle information list (at S13) and determines whether or not the vehicle information generated this time is a storage target (at S14).

If the car data coordinator 12 determines that the vehicle information has not been stored yet, or the vehicle information has already been stored but the vehicle information generated this time does not match the vehicle information that has already been stored, ("YES" at S14), the vehicle information generated this time is stored in the vehicle information list (at S15, corresponding to the vehicle information storage procedure), and the vehicle information storage process is terminated. For example, in a case where the vehicle speed of "60 km/h" is generated as the current vehicle information, the car data coordinator 12 stores the vehicle speed of "60 km/h as the current vehicle information in the vehicle information list when the storage area of the "vehicle speed" in the vehicle information list is empty, or the vehicle information already stored in the storage area of the "vehicle speed" in the vehicle information list is other than the vehicle speed of "60 km/h" and the vehicle information has been updated since the previous time.

On the other hand, when the car data coordinator 12 determines that the vehicle information has been already stored, and the vehicle information generated this time matches the already stored vehicle information, it determines that the vehicle information generated this time is not the storage target ("MO" at S14), and discards the vehicle information generated this time without storing it in the vehicle information list (at S16), and terminates the vehicle information storage process. For example, in a case where the vehicle speed of "60 km/h" is generated as the current vehicle information, the car data coordinator 12 discards the vehicle speed "60 km/h" generated as the current vehicle information without storing in the vehicle information list when the vehicle information already stored in the storage area of the "vehicle speed" in the vehicle information list is the vehicle speed "60 km/h", and the vehicle information has not been updated since the previous time.

(3) Update Process (See FIG. 13)

The car data coordinator 12 starts the update process when the vehicle information is updated in the vehicle information storage process described above and the vehicle information generated this time is stored in the vehicle information list so that the conditions for starting the update process are met. When starting the update process, the car data coordinator 12 refers to the service provision list (at S21), and specifies the application 9*a* as the provision destination of the vehicle information, which is associated with the vehicle information as the update target (at S22). After specifying the application 9*a* as the provision target of the vehicle information, the car data coordinator 12 refers to the vehicle information list (at S23), and provides the vehicle information stored in the vehicle information list to the application 9*a* specified as the provision destination of the vehicle information (at S24, corresponding to the vehicle information provision procedure), and the update process is terminated. That is, the car data coordinator 12 provides the latest value of the vehicle information to the application 9*a* specified as the destination of the vehicle information.

When the vehicle information generated this time is the "vehicle speed" in the service provision list shown in FIG. 10, for example, the car data coordinator 12 specifies the application B associated with the "vehicle speed" as the provision destination of the vehicle information, and provides the latest value of the "vehicle speed" to the application B. Similarly, when the vehicle information generated this time is the "vehicle location" in the service provision list shown in FIG. 10, for example, the car data coordinator 12 specifies the applications B and D associated with the "vehicle location" as the provision destination of the vehicle information, and provides the latest value of the "vehicle location" to the applications B and D.

Figure 14:
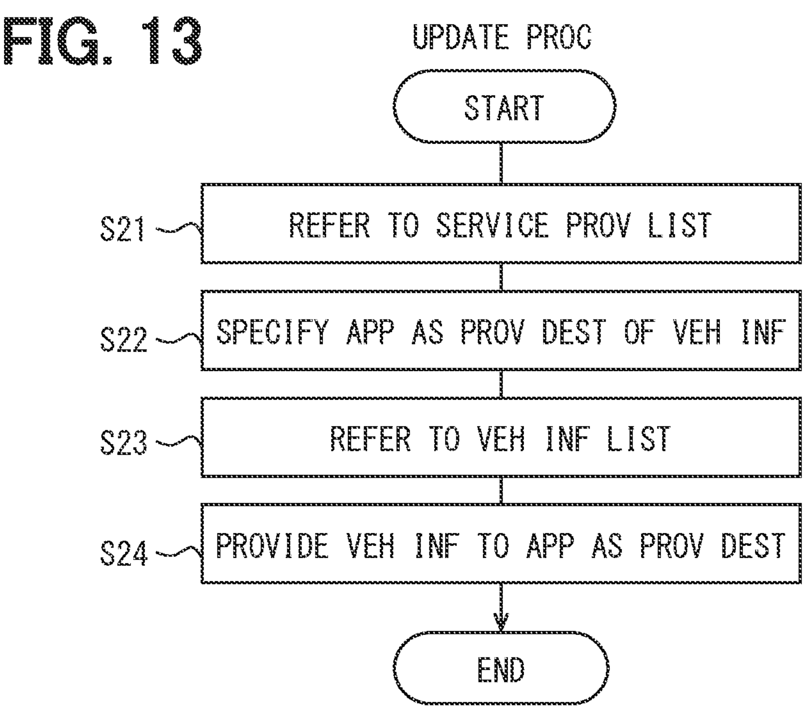
FIG. 14 is a flowchart showing provision request reception processing.
Figure 15:
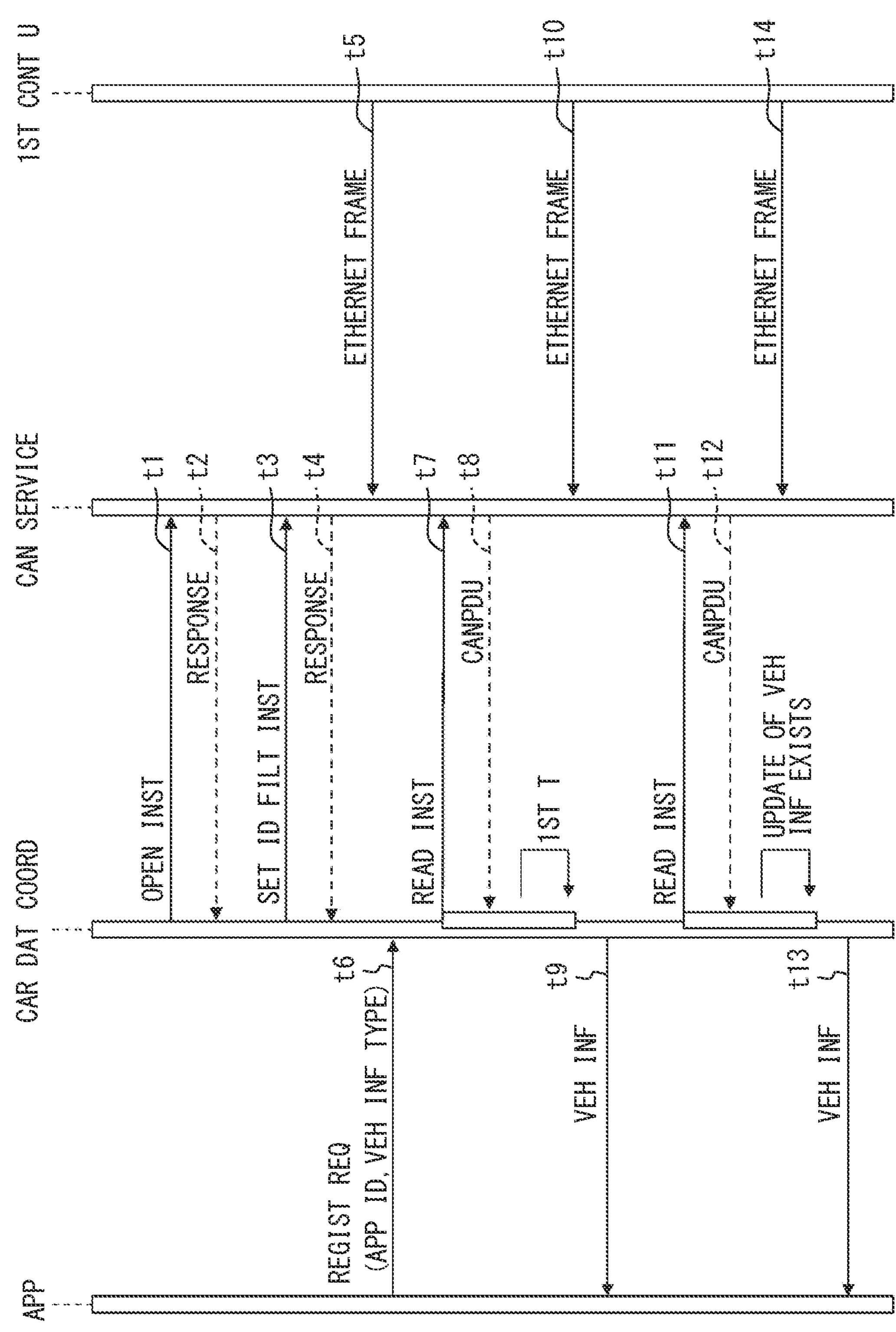
FIG. 15 is a sequence diagram.

(4) Provision Request Reception Process (See FIG. 14)

The car data coordinator 12 starts the provision request reception process when the conditions for starting the provision request reception process are established by receiving the provision request from the application 9*a*. When starting the provision request reception process, the car data coordinator 12 acquires the application ID and the designated vehicle information from the application 9*a* (at S31). The car data coordinator 12 specifies the application 9*a* as the provision destination of the vehicle information based on the acquired application ID (at S32), and specifies the vehicle information type to be provided to the application 9*a* as the provision target based on the acquired designated vehicle information (at S33). The car data coordinator 12 refers to the vehicle information list (at S34), and provides the vehicle information corresponding to the specified vehicle information type to the application 9*a* specified as the destination of the vehicle information (at S35, corresponding to the vehicle information provision procedure), and terminates the provision request reception process.

For example, when the application X notifies a request for providing the "existence of a smart key", the car data coordinator 12 specifies application X as the destination of the vehicle information, and provides the latest value of the "existence of a smart key" to the application X.

Next, the processing performed by the CAN service 11 and the car data coordinator 12 in cooperation with each other will be described with reference to FIGS. 15 to 18. For example, when the master ECU 1 is activated, the car data coordinator 12 notifies the CAN service 11 of an open instruction (at t1). When notified of the open instruction from the car data coordinator 12, the CAN service 11 notifies the car data coordinator 12 of a response to the notified open instruction (at t2), and generates a temporary data storage area.

The car data coordinator 12 notifies the set ID filter instruction to the CAN service 11 (at t3). When the set ID filter instruction is notified from the car data coordinator 12, the CAN service 11 notifies the car data coordinator 12 of a response to the notified set ID filter instruction (at t4), and holds the ID designated by the notified set ID filter instruction.

When the CAN service 11 receives the Ethernet frame from the first control unit 5 (at t5), it checks the held ID with the CAN ID stored in the received Ethernet frame. When the CAN service 11 specifies an Ethernet frame storing a CAN ID that matches the held ID, the CAN service 11 extracts the CAN PDU from the specified Ethernet frame and stores the extracted CAN PDU in a data storage area. When the CAN service 11 specifies an Ethernet frame storing a CAN ID that does not match the held ID, the CAN service 11 discards the specified Ethernet frame without extracting the CAN PDU from the specified Ethernet frame. Thereafter, the CAN service 11 repeats the above-described processing each time it receives an Ethernet frame from the first control unit 5 (at t10, t14, and t17).

When the application 9*a* notifies the car data coordinator 12 of the registration request (at t6), the car data coordinator 12 performs the registration request reception process described with reference to FIG. 11. The car data coordinator 12 acquires the application ID and the vehicle information type specified by the notified registration request, associates the acquired application ID and the vehicle information type, and registers them in the service provision list.

The car data coordinator 12 notifies the read instruction to the CAN service 11 at predetermined intervals (for example, intervals of several milliseconds) (at t7). When notifying of the read instruction from the car data coordinator 12, the CAN service 11 notifies the car data coordinator 12 of the CAN PDU stored in the data storage area (at t8). When the car data coordinator 12 acquires the CAN PDU from the CAN service 11, the car data coordinator 12 performs the vehicle information storage process described above with reference to FIG. 12. The car data coordinator 12 extracts the CAN data from the acquired CAN PDU, interprets the extracted CAN data to generate the vehicle information, refers to the vehicle information list, and determines whether the currently generated vehicle information is the storage target. After that, the car data coordinator 12 and the CAN service 11 repeat the above-described processes at intervals when the car data coordinator 12 notifies the read instruction (at t11, t12, t15, t16, t18, and t19).

When the car data coordinator 12 determines that the vehicle information has not been updated, it discards the vehicle information generated this time without storing it in the vehicle information list. On the other hand, when the car data coordinator 12 determines that the vehicle information has been updated, it stores the vehicle information generated this time in the vehicle information list, and performs the update process described above with reference to FIG. 13. The car data coordinator 12 refers to the service provision list, specifies the application 9*a* as the provision destination of the vehicle information, refers to the vehicle information list, and notifies the latest value of the vehicle information, i.e., the vehicle information stored in the vehicle information list to the application 9*a* specified as the destination of the vehicle information (at t9, t13, and t20).

Figure 17:
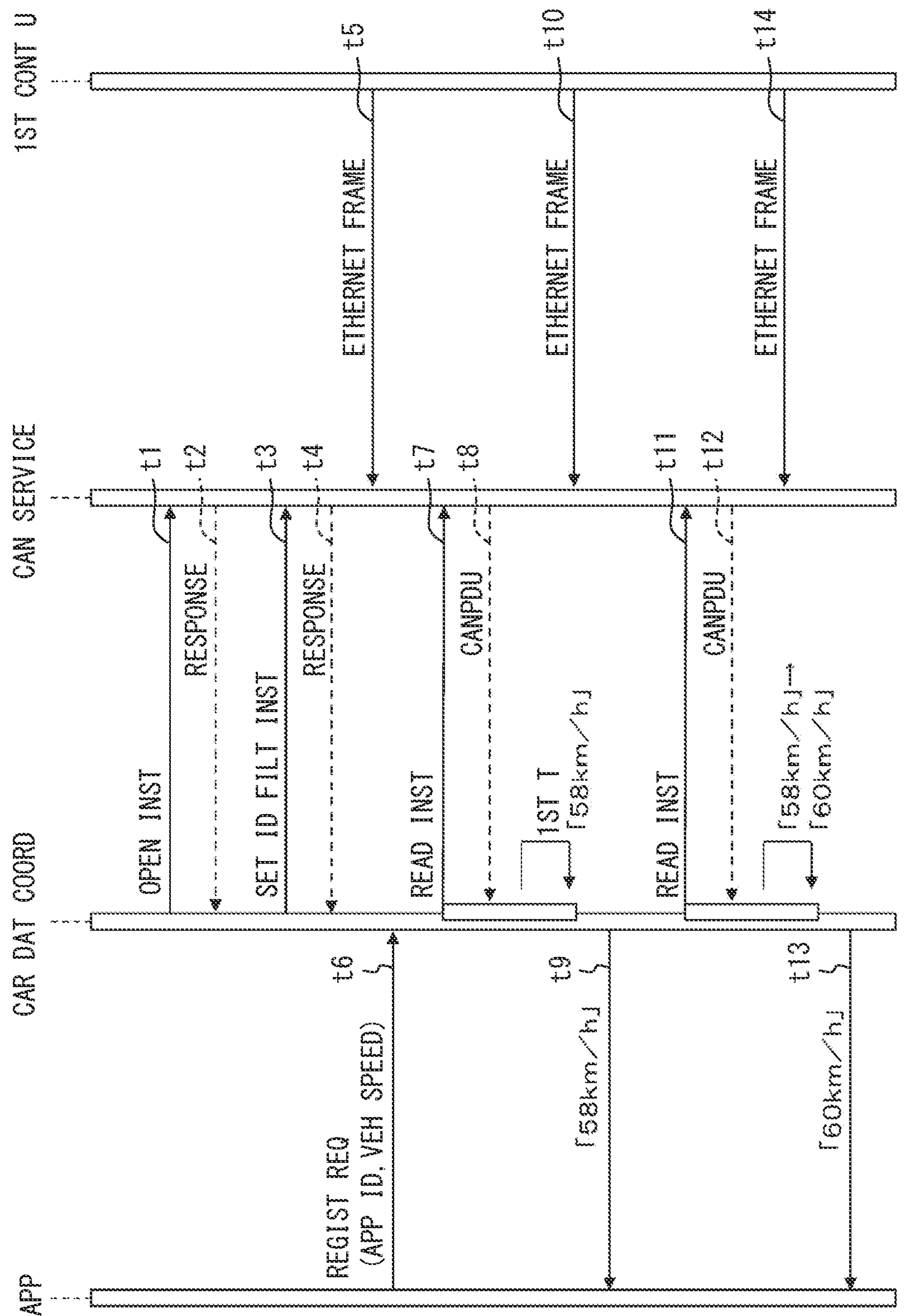
FIG. 17 is a sequence diagram.

The examples of FIGS. 17 and 18 show a case where the "vehicle speed" is designated as the vehicle information type by the registration request notified from the application 9*a*. In this case, the car data coordinator 12 notifies the application 9*a* of the vehicle information generated based on the CAN PDU acquired at the first from the CAN service 11 immediately after the registration request is notified from the application 9*a* (at t9). After that, the car data coordinator 12 notifies the vehicle speed of "60 km/h" as the vehicle information to the application 9*a* since the vehicle information has been updated since the previous time, for example, when the vehicle information generated based on the CAN PDU obtained from the CAN service 11 at the timing of "t8" is the vehicle speed of "58 km/h", and the vehicle information generated based on the CAN PDU obtained from the CAN service 11 at the timing of "t12" is the vehicle speed of "60 km/h" (at t13).

When the vehicle information generated based on the CAN PDU obtained at the timing of "t16" from the CAN service 11 is the vehicle speed of "60 km/h", the car data coordinator 12 discards the vehicle information without notifying the vehicle information to the application 9*a* since the vehicle information has not been updated since the previous time. In the car data coordinator 12, when the vehicle information generated based on the CAN PDU obtained from the CAN service 11 at the timing of "t19" is the vehicle speed of "62 km/h", the car data coordinator 12 notifies the vehicle speed "62 km/h" as the vehicle information to the application 9*a* since the vehicle information has been updated since the previous time (at t20). Although the case where the "vehicle speed" is designated as the vehicle information type has been described above, the same applies to other vehicle information types.

As described above, according to the present embodiment, the following actions and effects can be achieved.

In the master ECU 1, the CAN data is extracted from the CAN frame, the vehicle information is generated and stored based on the extracted CAN data, and the stored vehicle information is provided to the application 9*a* as the request source which requests the provision of the vehicle information. Thus, it is not necessary to prepare a program module for generating vehicle information for each application, and it is possible to suppress the increase in cost and the occurrence of a lot of time and effort when developing applications 9*a*, and it is also possible to suppress the consumption of memory capacity of the storage 7. Furthermore, there is no fear of generating different vehicle information from the same CAN data, and there is no possibility of trouble occurring in operations between applications 9*a*. Thereby, each of the plurality of applications 9*a* can easily and appropriately use the vehicle information based on the CAN data.

Triggered by the update of the stored vehicle information in the master ECU 1, the stored vehicle information is provided to the request source application 9*a* that requests the provision of the vehicle information. The latest vehicle information can be provided to the application 9a at the timing when the vehicle information is updated. That is, the latest vehicle information can be provided to the application 9a without the application 9a notifying the provision request.

Triggered by reception of a provision request from an application 9a in the master ECU 1, the stored vehicle information is provided to the request source application 9a that requests the provision of the vehicle information. The latest vehicle information can be provided to the application 9a at any timing when the application 9a notifies the provision request regardless of whether the vehicle information has been updated since the previous time.

In the master ECU 1, the CAN frame received from the CAN bus 2 is protocol-converted into an Ethernet frame, and the CAN data is extracted from the protocol-converted Ethernet frame. Since the applications 9a executed by the second control unit 6 that is not directly connected to the CAN bus 2 is the target, each of the plurality of applications 9a can easily and appropriately use the vehicle information based on the CAN data.

While the present disclosure has been described based on the embodiment, the present disclosure is not limited to the embodiment or structure described herein. The present disclosure includes various modification examples or variations within the scope of equivalents. Furthermore, various combinations and formations, and other combinations and formations including one, more than one or less than one element may be included in the scope and the spirit of the present disclosure.

The controller and the method according to the present disclosure may be achieved by a dedicated computer provided by constituting a processor and a memory programmed to execute one or more functions embodied by a computer program. Alternatively, the controller and the method thereof described in the present disclosure may be implemented by a dedicated computer provided by configuring a processor with one or more dedicated hardware logic circuits. Alternatively, the control unit and the method thereof described in the present disclosure may be implemented by one or more dedicated computers configured by a combination of a processor and a memory programmed to execute one or more functions and a processor configured by one or more hardware logic circuits. The computer program may also be stored on a computer readable and non-transitory tangible recording medium as instructions executed by a computer.

It is noted that a flowchart or the processing of the flowchart in the present application includes sections (also referred to as steps), each of which is represented, for instance, as S1. Further, each section can be divided into several sub-sections while several sections can be combined into a single section. Furthermore, each of thus configured sections can be also referred to as a device, module, or means.

What is claimed is:

1. An electronic control device comprising:

a control unit that executes a plurality of applications;

a data extraction unit that extracts data from a data frame conforming to a predetermined communication protocol;

a vehicle information generation unit that generates vehicle information based on the data extracted by the data extraction unit;

a vehicle information storage unit that stores the vehicle information generated by the vehicle information generation unit;

a registration request reception unit that receives, from each of the plurality of applications executed by the control unit, a registration request including application identification information representing the application as a request source and information regarding a type of vehicle information that the application requests to be transmitted, and stores, in association, the application identification information and the information regarding the type of vehicle information;

a vehicle information provision unit that, in response to a request from one of the plurality of applications whose registration request has been received by the registration request reception unit, provides the vehicle information stored in the vehicle information storage unit to the application that has requested the vehicle information; and an update existence determination unit that determines, for each of the plurality of applications, whether the vehicle information stored by the vehicle information storage unit has been updated since a previous provision of the vehicle information to the respective application;

wherein:

the vehicle information generated by the vehicle information generation unit is data uniquely specified from the data extracted from the data frame and has a smaller amount of data than the data extracted from the data frame; and the vehicle information provision unit is configured to (i) provide the vehicle information stored by the vehicle information storage unit to the application when the update existence determination unit determines that the vehicle information has been updated since the previous provision of the vehicle information to the application, and (ii) refrain from providing the vehicle information to the application when the vehicle information has not been updated since the previous provision.

2. The electronic control device according to claim 1, further comprising:

a provision request reception unit that receives a provision request from each of the plurality of applications, wherein:

when the provision request reception unit has received the provision request from the one of the plurality of applications, the vehicle information provision unit provides the vehicle information stored by the vehicle information storage unit to the application that has requested the vehicle information.

3. The electronic control device according to claim 1, wherein:

the data extraction unit, the vehicle information generation unit, the vehicle information storage unit, and the vehicle information provision unit are executed by the control unit.

4. The electronic control device according to claim 1, wherein:

the vehicle information provision unit provides the vehicle information with different granularity to the application that has requested the vehicle information.

5. The electronic control device according to claim 1, further comprising:

one or more processors, wherein:

the one or more processors provides at least one of: the control unit; the data extraction unit; the vehicle information generation unit; the vehicle information storage unit; and the vehicle information provision unit.

6. A vehicle information provision method for an electronic control device including a control unit that executes a plurality of applications, the vehicle information provision method comprising:

a data extraction procedure for extracting data from a data frame conforming to a predetermined communication protocol;

a vehicle information generation procedure for generating vehicle information based on the data extracted by the data extraction procedure;

a vehicle information storage procedure for storing the vehicle information generated by the vehicle information generation procedure;

a registration request reception procedure for receiving, from each of the plurality of applications executed by the control unit, a registration request including application identification information representing the application as a request source and information regarding a type of vehicle information that the application requests to be transmitted, and for storing, in association, the application identification information and the information regarding the type of vehicle information;

a vehicle information provision procedure for, in response to a request from one of the plurality of applications whose registration request has been received by the registration request reception-unit procedure, providing the vehicle information stored by the vehicle information storage procedure to the application that has requested the vehicle information; and an update existence determination procedure for determining, for each of the plurality of applications, whether the vehicle information stored by the vehicle information storage procedure has been updated since a previous provision of the vehicle information to the respective application;

wherein:

the vehicle information generated by the vehicle information generation procedure is data uniquely specified from the data extracted from the data frame and has a smaller amount of data than the data extracted from the data frame; and the vehicle information provision procedure further includes (i) providing the vehicle information stored by the vehicle information storage procedure to the application when the update existence determination procedure determines that the vehicle information has been updated since the previous provision of the vehicle information to the application, and (ii) refraining from providing the vehicle information to the application when the vehicle information has not been updated since the previous provision.

7. A non-transitory computer readable storage medium storing a vehicle information provision program causing an electronic control device including a control unit that executes a plurality of applications to execute:

a data extraction procedure for extracting data from a data frame conforming to a predetermined communication protocol;

a vehicle information generation procedure for generating vehicle information based on the data extracted by the data extraction procedure;

a vehicle information storage procedure for storing the vehicle information generated by the vehicle information generation procedure;

a registration request reception procedure for receiving, from each of the plurality of applications executed by the control unit, a registration request including application identification information representing the application as a request source and information regarding a type of vehicle information that the application requests to be transmitted, and for storing, in association, the application identification information and the information regarding the type of vehicle information;

a vehicle information provision procedure for, in response to a request from one of the plurality of applications whose registration request has been received by the registration request reception procedure, providing the vehicle information stored by the vehicle information storage procedure to the application that has requested the vehicle information; and an update existence determination procedure for determining, for each of the plurality of applications, whether the vehicle information stored by the vehicle information storage procedure has been updated since a previous provision of the vehicle information to the respective application;

wherein:

the vehicle information generated by the vehicle information generation procedure is data uniquely specified from the data extracted from the data frame and has a smaller amount of data than the data extracted from the data frame; and the vehicle information provision procedure further includes (i) providing the vehicle information stored by the vehicle information storage procedure to the application when the update existence determination procedure determines that the vehicle information has been updated since the previous provision of the vehicle information to the application, and (ii) refraining from providing the vehicle information to the application when the vehicle information has not been updated since the previous provision.

8. The electronic control device according to claim 1, wherein:

the electronic control device includes an application layer to which the plurality of applications belong, and a middleware layer that is separate from the application layer;

the middleware layer at least includes a controller area network (CAN) service and a car data coordinator, and a scene coordinator; and each application of the application layer, when requesting the vehicle information, requests transmission of information from one of the CAN service, the car data coordinator, or the scene coordinator belonging to the middleware layer, via an application programming interface, according to a granularity of the requested information.

* * * * *